(12) United States Patent
Converse et al.

(10) Patent No.: US 11,177,664 B2
(45) Date of Patent: Nov. 16, 2021

(54) SYSTEM AND METHOD FOR DYNAMIC VOLTAGE REGULATION OF AN ENGINE ON A VARIABLE FREQUENCY BUS

(71) Applicant: Caterpillar Inc., Peoria, IL (US)

(72) Inventors: Perry Converse, Lafayette, IN (US); Per Ole Sorensen, Stoholm (DK); Mike Snopko, Washington, IL (US); David Miller, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 61 days.

(21) Appl. No.: 16/672,230

(22) Filed: Nov. 1, 2019

(65) Prior Publication Data

US 2021/0135459 A1 May 6, 2021

(51) Int. Cl.
*H02J 3/46* (2006.01)
*H02J 13/00* (2006.01)

(52) U.S. Cl.
CPC .......... *H02J 3/46* (2013.01); *H02J 13/00002* (2020.01)

(58) Field of Classification Search
CPC .............................. H02J 3/46; H02J 13/00002
USPC ........................................................ 307/52
See application file for complete search history.

(56) References Cited

U.S. PATENT DOCUMENTS

| 956,887 A | 5/1910 | Cochran |
| 5,168,208 A | 12/1992 | Schultz et al. |
| 7,024,253 B2 | 4/2006 | Gaikwad et al. |
| 7,318,154 B2 | 1/2008 | Tehee, Jr. |
| 8,280,533 B2 | 10/2012 | Wojsznis et al. |
| 9,203,333 B2 | 12/2015 | Larsen et al. |
| 9,467,080 B2 | 10/2016 | Frampton et al. |
| 9,708,950 B2 | 7/2017 | Falkowski et al. |
| 9,896,982 B1 * | 2/2018 | Zhang ..................... F01N 3/208 |
| 2016/0378078 A1 | 12/2016 | Lamparter et al. |
| 2017/0338759 A1 | 11/2017 | Vänskä et al. |

FOREIGN PATENT DOCUMENTS

| CN | 104836498 A | 8/2015 |
| CN | 107769645 A | 3/2018 |

\* cited by examiner

*Primary Examiner* — Hal Kaplan
(74) *Attorney, Agent, or Firm* — von Briesen & Roper, s.c.

(57) ABSTRACT

A system and method for variable frequency voltage regulation is presented. The system includes a variable frequency bus and a variable frequency load directly connected to the variable frequency bus. A plurality of variable frequency gensets are directly connected to the variable frequency bus. Each variable frequency genset includes a genset controller configured to select set points based on a selected frequency response curve of the variable frequency bus. A variable frequency voltage regulator is configured to regulate an electrical output of the variable frequency generator based on the selected set points. The system includes a voltage regulation controller configured to determine a desired bus frequency based on the variable frequency load, and determine an optimal frequency response curve based on the desired bus frequency and a frequency response model of each VFG. The selected frequency response curve is updated based on the determined optimal frequency response curve.

20 Claims, 4 Drawing Sheets

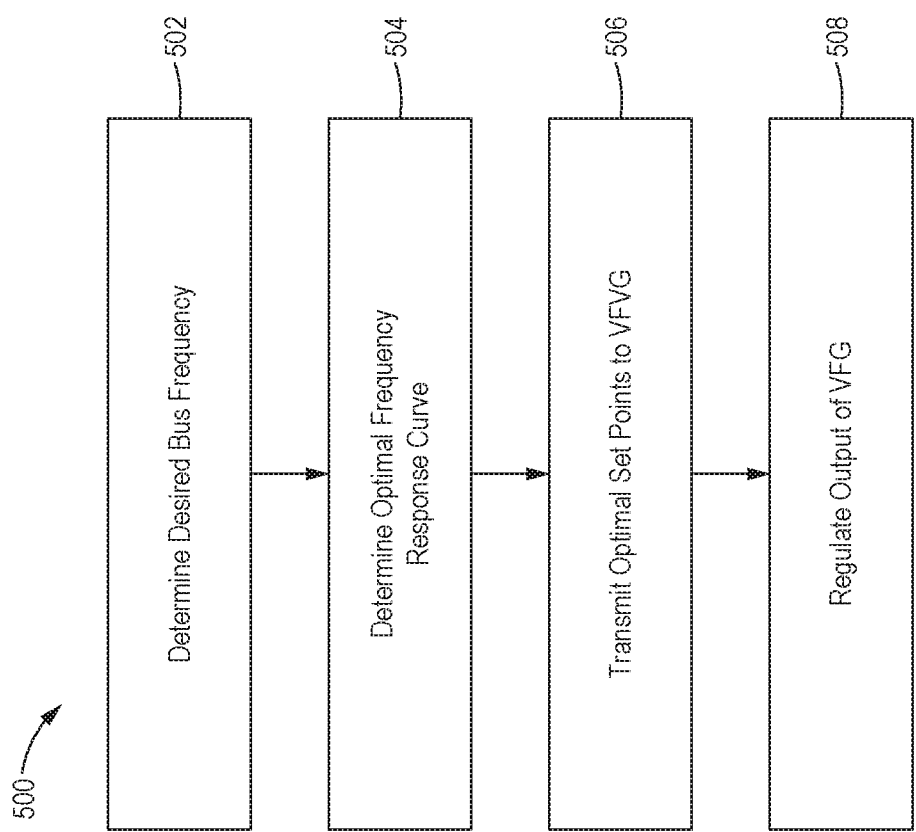

SYSTEM AND METHOD FOR DYNAMIC VOLTAGE REGULATION OF AN ENGINE ON A VARIABLE FREQUENCY BUS

TECHNICAL FIELD

This disclosure relates generally to generator sets and, more particularly relates to a system and method for voltage regulation of multiple generator sets on a variable frequency bus.

BACKGROUND

Off-grid power generation, as in marine vessels for instance, is achieved by coupling multiple generator sets (gensets) to drive both primary loads, such as propellers or other drive mechanisms, as well as various auxiliary loads, such as climate control systems, lighting systems, pumps, and the like. Different genset configurations are selected according to factors such as load optimization, load distribution, fuel economy, reliability, costs of implementation and maintenance, and the like. A genset includes in combination a prime mover and an electrical generator. The prime mover may be a mechanical engine such as an internal combustion engine (e.g., a diesel compression ignition engine) or gas turbine in which a hydrocarbon-based fuel and air is combusted to release the chemical energy therein and to convert that energy into a mechanical or motive force. The motive force, in turn, is used to rotate a rotor relative to a stator of the generator so that a rotating magnetic field induces an electrical current in the field windings of the stator. The generated electricity is used to service the primary and auxiliary load demands.

The frequency and voltage of the gensets must be synchronized with the electrical load on the common bus. This is achieved by converting the genset output to a constant frequency, constant voltage output that is compatible with that of the common bus. While some equipment may operate directly at the constant frequency and constant voltage of the common bus, some equipment, such as variable frequency equipment, may not be compatible. Incompatible equipment, such as variable frequency gensets or variable frequency loads, may require an additional conversion stage to convert the constant frequency and the constant voltage of the common bus to the specific frequency and the specific voltage desired by the variable frequency equipment.

Changes in the variable frequency load can have significant impacts on the prime mover and/or generator of the genset. For example, when a large load comes online the prime mover speed may rapidly decrease thus effecting the generator output while also imparting significant stresses on the mechanical components of the prime mover. A voltage regulator can compensate for transient voltage fluctuation by increasing or reducing the excitation on the stationary coil in the generator. A typical voltage regulator is configured with predetermined set points which correlate the desired output with the corresponding excitation current necessary to achieve the desired compensation. However, the setpoints of a typical voltage regulator are preset for specific bus frequencies and are not adaptable to a continuum of bus frequencies.

The present disclosure is directed at addressing one or more of the deficiencies and disadvantages set forth above. However, it should be appreciated that the solution of any particular problem is not a limitation on the scope of this disclosure or of the attached claims except to the extent expressly noted.

SUMMARY OF THE DISCLOSURE

In one example of the present disclosure, a variable frequency voltage regulation system is provided. The variable frequency voltage regulation system may include a variable frequency bus and a variable frequency load directly connected to the variable frequency bus. The system may include a plurality of variable frequency gensets directly connected to the variable frequency bus, wherein each variable frequency genset includes a genset controller and a variable frequency voltage regulator. The genset controller is configured to select set points based on a selected frequency response curve of the variable frequency genset, and the variable frequency voltage regulator is configured to regulate an electrical output of the variable frequency genset based on the selected set points. The system may include a voltage regulation controller in electrical communication with the plurality of genset controllers and the variable frequency bus. The voltage regulation controller is configured to determine a desired bus frequency of the variable frequency bus based on the variable frequency load; determine an optimal frequency response curve based on the desired bus frequency and a frequency response model of each variable frequency genset; and update the selected frequency response curve based on the determined optimal frequency response curve.

In another example of the present disclosure, a method for variable frequency voltage regulation of a plurality of variable frequency gensets is provided, wherein the plurality of variable frequency gensets are directly connected to a variable frequency bus. The method includes selecting set points based on a selected frequency response curve of a corresponding variable frequency genset; regulating an electrical output of the variable frequency genset based on the selected set points; and determining a desired bus frequency of the variable frequency bus based on a variable frequency load directly connected to the variable frequency bus. And optimal frequency response curve is determined based on the desired bus frequency and a frequency response model of each variable frequency genset. The selected frequency response curve is updated based on the determined optimal frequency response curve.

In another example of the present disclosure, a variable frequency microgrid is provided. The variable frequency microgrid may include a variable frequency bus configured to operate at a range of bus frequencies. A plurality of variable frequency gensets may be operatively connected to the variable frequency bus, and a variable frequency load may be operatively connected to the variable frequency bus. A voltage regulation controller may be operatively connected to the variable frequency bus and the plurality of variable frequency gensets. The voltage regulation controller is configured to determine an optimal bus frequency, and determine an optimal frequency response curve for each variable frequency genset based on the optimal bus frequency. The variable frequency microgrid may include a plurality of variable frequency voltage regulator, wherein each variable frequency voltage regulator is configured to regulate an output of a corresponding variable frequency genset according to optimal setpoints associated with the determined optimal frequency response curved.

BRIEF DESCRIPTION OF THE DRAWINGS

FIG. 5 is a flow chart for a voltage regulation control strategy.

DETAILED DESCRIPTION

This disclosure relates to an electrical power system which includes a plurality of variable frequency generator sets (VFGs) configured to generate and supply power to a variable frequency load (VFL) via a variable frequency bus (VFB). The disclosure also relates to the control strategies and electronic controllers for regulating the operation of the VFGs. In particular, the disclosure relates to a variable frequency voltage regulator (VFVR) system for determining an optimal knee frequency for each VFG based on a desired bus frequency and performance characteristics of each VFG. The knee frequency is associated with a volts per hertz threshold at which the VFVR acts to regulate the electrical output of the genset according to an optimal set points of an optimal frequency response curve.

Figure 1:
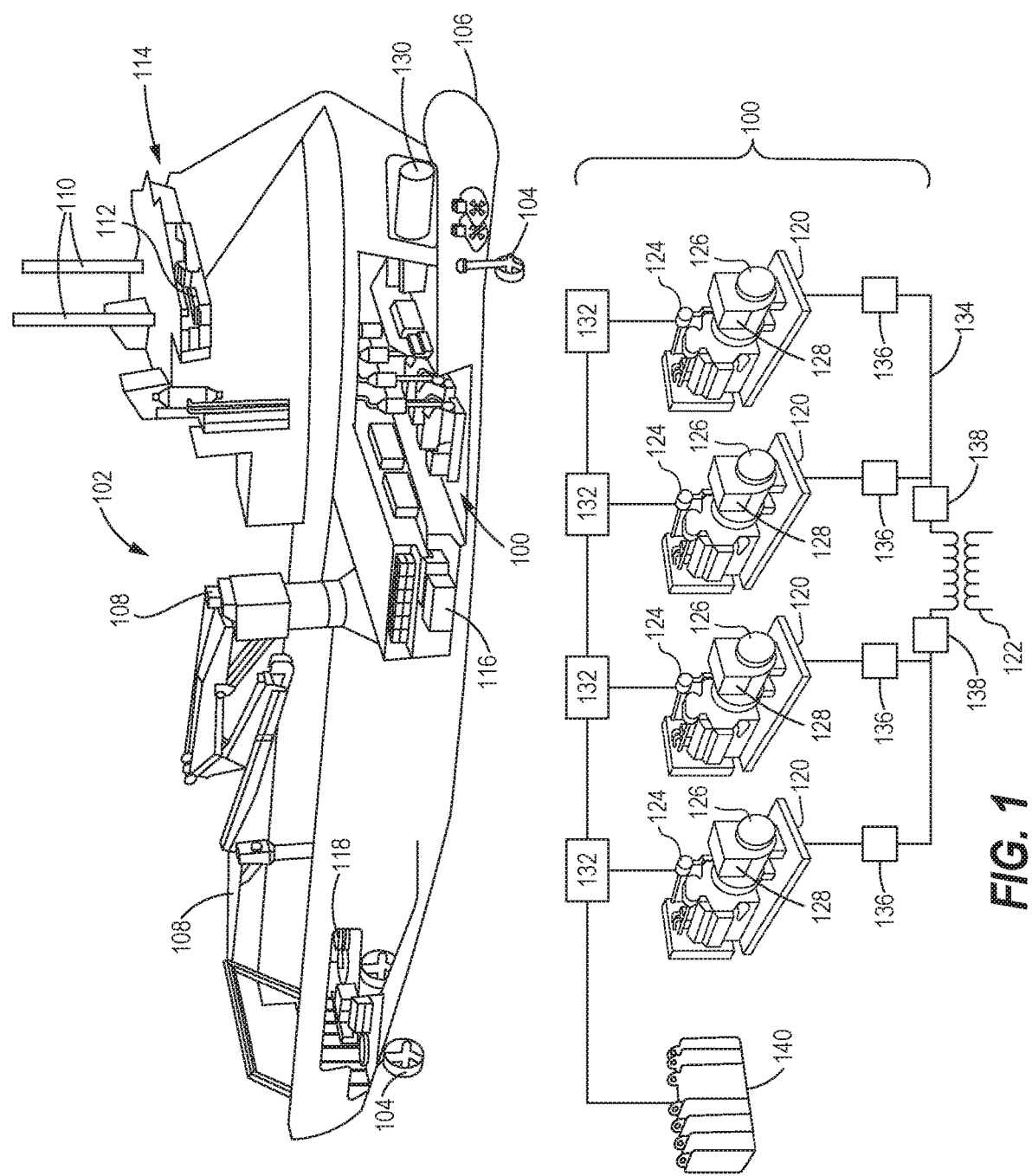
FIG. 1 is an illustration of a marine vessel side elevation view of with a variable frequency voltage regulation system in accordance with an illustrative embodiment.

Now referring to the drawings, wherein like reference numbers refer to like elements, illustrated in FIG. 1 is a VFVR system 100 that may be arranged to generate electric power for an isolated electrical load. For example, the VFVR system 100 may be arranged to service the electrical requirements of a marine vessel 102 like a freighter or cargo ship. A marine vessel 102 in FIG. 1 is one example of a system with variable frequency power requirements; however, the teachings of this disclosure can be employed with ease and efficacy on any other machine with variable frequency power requirements. The VFVR system 100 may generate electrical power for propulsion units 104 mounted on the hull 106 of the marine vessel 102. In one embodiment, the propulsion units 104 may be a plurality of azimuth thrusters which are electrically driven units that can independently rotate with respect to the hull of the marine vessel 102, eliminating the need for a rudder. The azimuth thrusters may be powered by electricity generated by the VFVR system 100 rather than being directly driven by a power unit such as an engine, reactor, or boiler.

In addition to the propulsion units 104, the electrical requirements of the marine vessel 102 may include motorized cranes 108 for lifting and moving freight, communication equipment 110 for communicating with shore and other marine vessels, and the like. Furthermore, the VFVR system 100 may supply power to the navigation controls 112 that may be disposed in the bridge 114 of the marine vessel for directing movement and operation of the marine vessel, heating ventilation and air condition (HVAC) 116 for providing environmental control for the marine vessel, or living quarter and food preparation 118. These components together make up the electrical load of the marine vessel.

The marine vessel 102 is electrically isolated from a larger power grid, therefore, the independent VFVR system 100 is configured to supply power for the electrical power required by the various components of the marine vessel 102 via a localized microgrid. The term independent may refer to an "off-grid" VFVR 100 such as isolated systems on an island, drilling platform, remote location, and the like. Other marine applications for the VFVR system 100, in addition to the freighter illustrated in FIG. 1, may include military vessels, passenger liners, tankers, aircrafts, and the like. Likewise, the VFVR system 100 described herein may be utilized for any other application where electrical power from a utility supplied power grid is not readily available or may be interrupted. For example, the VFVR system 100 may be utilized in oil procuring applications, gas procuring applications, temporary military bases, or the like. Advantageously, the VFVR system 100 described herein can operate independently of a larger electrical grid where electrical power is supplied by external sources, such as power plants, nuclear reactors, hydro-electric dams, solar generation, wind generation, the like.

To generate electrical power, the VFVR system 100 includes a plurality of VFGs 120 which operate in parallel to service the power demand of the VFL 122. Each genset 120 includes a prime mover 124 rotationally coupled to an electrical generator 126. The prime mover may be an internal combustion engine, in particular, a diesel compression ignition engine; while the electrical generator 126 may be a single phase generator or, in particular, a multi-phase alternator. The prime mover 124 can combust hydrocarbon fuel and air to produce a motive power that rotates a magnetic field in the electrical generator 126. The rotating magnetic field induces a current in stator field windings to convert the motive power to electrical power. Each VFG 120 includes a variable frequency voltage regulator (VFVR) 128 that may regulate the electrical output of the generator 126 to compensate for changes in bus frequency or bus voltage stemming from changes in the VFL 122. The VFVR 128 regulates the output of the corresponding VFG 120 to ensure a desired output voltage and desired output frequency is met.

To provide fuel for the prime mover 124 to combust, the electrical power system 100 may be operably associated with one or more fuel tanks 130 or reservoirs. In addition to the example of an internal combustion engine, other variations of prime movers 124 include gas combustion turbines, rotary engines, reactors, steam boilers, and the like. While the electrical capacity of the VFGs 120 described herein may be rated at any suitable quantity, an exemplary genset may produce several kilowatts and the combination of the gensets may together produce several hundred kilowatts. To govern operation of the prime mover 124 and VFVR 128, each VFG 120 may include an electronic VFG controller 132. The VFG controller 132 that may be a computing device capable of performing typical computing and digital processing functions.

The electrical power generated by the electrical generator 126 of the gensets 120 may be in the form of alternating current (AC), where voltage and current periodically reverses direction, in contrast to direct current (DC). The phase change, or shift in direction of the alternating current, may produce current and voltage in accordance with a cycling waveform. In particular, a sinusoidal waveform in which the amplitude of the current and voltage periodically and repetitively changes from a positive value to an equal negative value and back to the positive value. To combine the electrical current being generated, the plurality of VFGs 120 may be electrically connected to a VFB 134 in a parallel arrangement. In a parallel arrangement, the total current generated by the VFVR system 100 is the sum of the individual currents generated by each of the plurality of VFGs 120 while the potential or voltage is generally the same across each of the gensets. The VFB 134 can be electrically connected through a network or circuit with the electrical equipment of the marine vessel 102, considered together to make up the VFL 122 of the vessel. The sum total of electrical power supplied by each of the plurality of VFGs 120 make up the power source of the vessel 102. The plurality of VFGs 120, the VFL 122, and the VFB 143 may together make up a variable frequency microgrid.

The VFVR system 100 is a variable frequency system in which all of the components of the system are capable of operating at variable frequencies independent of any frequency conversion stages. Independent of any frequency conversion stage refers to arrangements in which the VFGs 120 and the VFL 122 are directly connected to the VFB 134. More specifically, an output 136 of the electrical generator 126 and an input 138 of the VFL 122 are directly connected to the VFB 134 without an intervening frequency conversion stage, such as a variable frequency drive (VFD). On a common bus arrangement, each VFG is paired with a VFD which converts the variable frequency output to a constant frequency, constant voltage output which is more suitable for a common bus which operates on a constant frequency, and constant voltage. Similarly, each VFL is paired with a VFD which converts the constant frequency, constant voltage input from the common bus to a variable frequency input for the VFL 122, e.g. variable frequency thrusters. The VFVR system 100 can improve fuel efficiency, reduce system costs and complexity, and decrease maintenance costs by operatively connecting the output 136 of each electrical generator 126 directly to the VFB 134 and by operatively connecting the input 138 of the VFL 132 directly to the VFB 134 and thus eliminating the need for VFDs.

While removing VFDs can improve overall efficiency for the system 100, changes in the VFL 134 can have adverse effects on the VFGs 120. For example, a sudden increase in the load may result in a sudden decrease in the rotational speed of the prime mover and the generator causing the genset to stall and go offline. To compensate for transients, each VFG 120 may include a VFVR 128 which can regulate the magnetic flux density within the generator 126. Since the electrical output of each VFG 120 is directly proportional to this flux density, the VFVR 128 can regulate the output voltage and/or frequency of each alternator 126. To regulate the output, the VFVR 128 can apply a field current to the stationary coils to control the magnitude of the flux density. The field current determines the excitation level of the generator 126 and determines the magnitude of the rotating magnetic field which in turn induces a current in the stator coils.

In a brushless alternator style generator, the brushless alternator may include two alternators which share the rotating shaft, a smaller exciter alternator and a larger main alternator. Varying the field current of the exciter stationary coil varies the multi-phase output from the exciter rotating coils. The exciter alternator output is rectified and the resultant DC current is supplied to the main alternator rotating coils which yields a multi-phase output from the main alternator stationary coils. Thus, the field current supplied to the stationary coils of the smaller exciter alternator may indirectly control the output of the main alternator. A voltage regulator may modulate the field current supplied to the exciter stationary coils to regulate the electrical output of the main alternator.

In a common bus arrangement with one or more variable frequency gensets, a voltage regulator is programmed with frequency response curves, such as a 50 Hz frequency response curve or a 60 Hz frequency response curve, for fixed bus frequencies. Typically, a variable frequency genset is switched between the two operating frequencies based on the power demand requirements of the load connected to the common bus. When changes in the load occur, the voltage regulator is configured to regulate output voltage based on a selected frequency response curve. However, a typical voltage regulator cannot compensate for a range of frequencies such as that on a variable frequency bus.

The VFVR 128 is configured to dynamically regulate the output of the alternator 126 based on at least one of a desired frequency of the VFB 134 or an optimal frequency response curve at the desired frequency. To coordinate the VFVRs 128, a voltage regulation controller 140 may be designated. The voltage regulation controller 140 may communicate with each of the individual VFG controllers 132 to direct operation of the individual VFVRs 128. The electronic controllers 132, 140 may include a processor, an application specific integrated circuit (ASIC), or other appropriate circuitry for performing logic and digital functions, and may have associated data storage capabilities. The electronic controllers 132, 140 may be discrete, individual units, or their functions may be distributed over a plurality of distinct components. Thus, the VFG controllers 132 and the voltage regulation controller 140 may be implemented on the same computing equipment rather than as two distinct units as shown in FIG. 1. The electronic controllers 132, 140 may operate and communicate with each other via various means such as digital signals, analog signals, or through any other suitable means. The electronic controllers may communicate with each other via wired connections or via wireless connections through radio frequency or Wi-Fi mediums.

The VFVR system 100 dynamically regulates the electrical output of each alternator 126 to meet the desired frequency or the desired voltage of the VFB 134. While the VFVR system 100 can regulate the electrical output based on one of a desired frequency or desired voltage, the system 100 will be described herein with relation to a desired bus frequency of the VFB 134. For example, the VFVR system 100 may determine a desired bus frequency of the VFB 134, then determine an optimal frequency response curve for each VFG 120 which corresponds to that desired bus frequency. The VFVR system 100 updates the selected frequency response curve of each VFVR 128 with the determined optimal frequency response curve.

Figure 2:
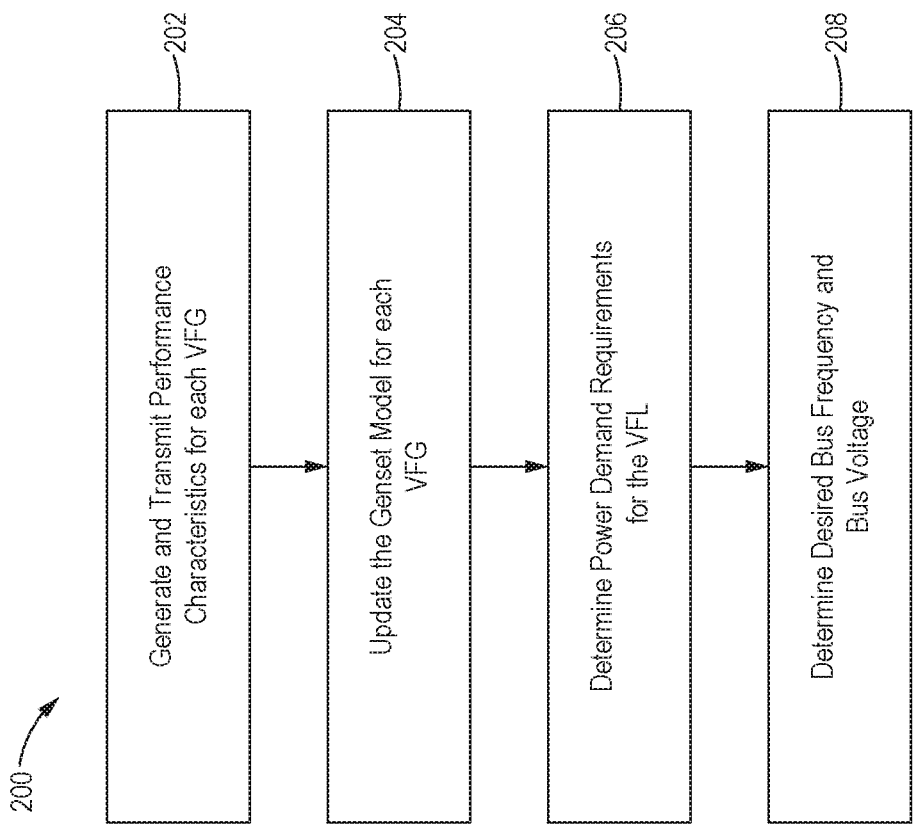
FIG. 2 is a flow chart for a desired bus frequency control strategy.

Referring to FIG. 2, a desired bus frequency control strategy flow chart 200 is illustrated. The voltage regulation controller 140 determines the desired bus frequency based on performance characteristics of the VFGs 120 and power demand requirements of the VFL 122. The performance characteristics of the VFGs 120 may include at least one of a torque response map of the prime mover 124, a fuel efficiency map of the generator 126, or the like. As previously mentioned, the torque response map determines the fuel efficiency ranges of the prime mover 124, while the fuel efficiency map determines the energy conversion efficiency of the electrical generator 126. Together, the torque response map and the fuel efficiency map may define a genset model for each VFG 120. The genset model may be predetermined based on historical operational data and can be updated in real-time based on current operational data generated while in servicing the VFL 122.

At step 202, the each genset controller 132 generates and transmits the current performance characteristics of the corresponding VFGs 120 to the voltage regulation controller 140. At step 204, the voltage regulation controller 140 updates the genset model for each VFG 120 based on the received performance characteristics. The genset model for each VFG 120 may be stored in local memory of the voltage regulation controller 140 or may be stored remotely such as in the memory of each corresponding genset controller 132, elsewhere on the marine vessel 102, or remotely accessible from the marine vessel 102.

At step 206, the voltage regulation controller 140 may determine the power demand requirements of the VFL 122. The voltage regulation controller 140 may receive load request data associated with the VFL 122. The load request data may include identifying information regarding the magnitude or type of the VFL 122 requested such as, for example, a throttle position associated with the propulsion units 104. The power demand requirement may be determined based on at least one of a frequency requirement, a voltage requirement, future load requirement, a variability requirement, the load request data associated with the VFL 122, or historical data of the VFL 122. A future load requirement may include expected known changes in the VFL such as, for example, control strategies of the propulsion units 104 which vary over time. Whereas a variability requirement may include an unknown noise or variability component of a type of VFL 122 which can be predicted or modeled.

At step 208, the voltage regulation controller 140 may determine the desired bus frequency and desired bus voltage based on the determined power demand requirements. In addition to the power demand requirements, the voltage regulation controller 140 may also use the generated performance characteristics of the VFGs 120, the corresponding genset model, or a combination thereof to determine the desired bus frequency.

In one example, if the prime mover 124 is an internal combustion engine, each prime mover may operate in accordance with an associated torque response curve that determines the fuel efficiency ranges of the prime mover 124 as it burns fuel and produces rotational power based on fuel type, load, and speed. The torque response curve may determine or indicate where the prime mover is operating most efficiently or according to its best fuel economy. The torque response curve is an example of a performance characteristic that the voltage regulation controller 140 may use to determine the desired bus frequency.

The voltage regulation controller 140 may determine an optimal frequency response curve for each VFG 120 based on the determined desired bus frequency. Similarly, the voltage regulation controller 140 may also use corresponding performance characteristics and/or genset model in combination with the desired to bus frequency to determine the optimal frequency response curve. With reference FIG. 3, an optimal response curve control strategy flow chart 300 is illustrated. At step 302, the genset controller 132 selects the current set points for the VFVR 128 based on a selected frequency response curve of the VFG 120. The selected set points may be stored in memory locally on the genset controller 132 or in a remote location accessible by the genset controller 132.

Figure 4:
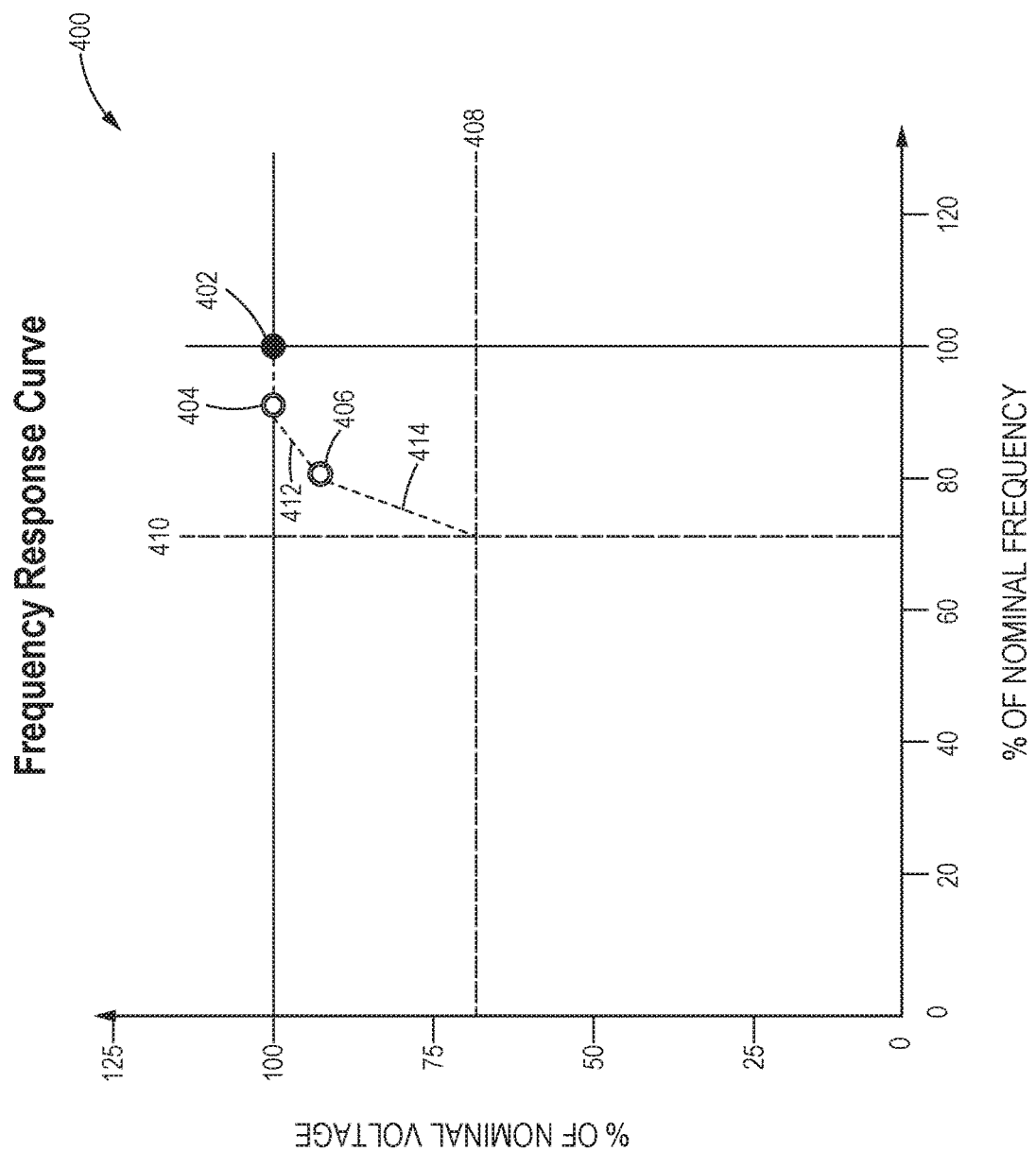
FIG. 4 is a graph of a frequency response curve.

An example graph of a frequency response curve 400 is illustrated in FIG. 4. Each frequency response curve 400 may include a plurality of setpoints such as, but not limited to, a desired frequency 402, a $1^{st}$ knee frequency 404, a $2^{nd}$ knee frequency 406, an undervoltage threshold 408, and underfrequency threshold 410. For a selected frequency response curve 400, the VFVR 128 controls the output of the generator 126 based on the set points of that selected frequency response curve 400. The genset controller 132 may include an output sensor (not shown) configured to detect the electrical output frequency and voltage of the alternator 126. The genset controller 126 may determine an error between the actual output and the desired output based on the selected frequency response curve 400. The determined error is used to correct the field current outputted by the VFVR 128 to regulate the output of the generator 126.

The $1^{st}$ knee frequency 404 may correspond to a setpoint at which the VFVR 128 may begin compensating for a decrease in the actual output frequency of the generator 126. The $1^{st}$ knee frequency 404 is the output frequency at which the output voltage of the generator 126 begins to decrease in response to the dropping output frequency. The genset controller 132 transmits a control signal, which may be proportional to the previously mentioned error, to control the VFVR 128 to regulate the generator 126 output based on the determined error. The frequency response curve 400 includes a first region 412 between the $1^{st}$ and $2^{nd}$ knee frequencies, and a second region 414 between the $2^{nd}$ knee frequency and the intersection of the undervoltage threshold 408 and the underfrequency threshold 410. The genset controller 132 may act to avoid the $2^{nd}$ knee frequency because the increase in slope of the second region 414 may result in the VFG 120 quickly approaching the undervoltage setpoint 408 and/or the underfrequency setpoint 410 which may result in the genset stalling.

While only one frequency response curve 400 is shown, it should be appreciated that the some of the frequency response models may have more than one frequency response curve for each available bus frequency. In one example, the frequency model may have three unique frequency response curves associated with each desired bus frequency. Each frequency response curve may have unique knee frequencies defining unique slopes for the regions therebetween. The frequency curve at the desired bus frequency may be selected according to a desired engine response. A first frequency response curve may have a fast prime mover response at the cost of increased fuel usage, a second frequency response have a slower prime mover response but with improved fuel efficiency, and a third frequency response curve may be optimized to reduce emissions from the prime mover. When more than one frequency response curve is available in the frequency model at a single desired bus frequency, the frequency response curve may be selected manually by an operator or automatically by the voltage regulation controller 140. When selected manually, an operator can choose from various modes such as performance mode, fuel efficiency mode, emissions mode, or the like. In the illustrated example, the performance mode would be associated with the first frequency response curve, the fuel efficiency mode would be associated with the second frequency response curve, and the emissions mode would be associated with the third frequency response curve.

Figure 3:
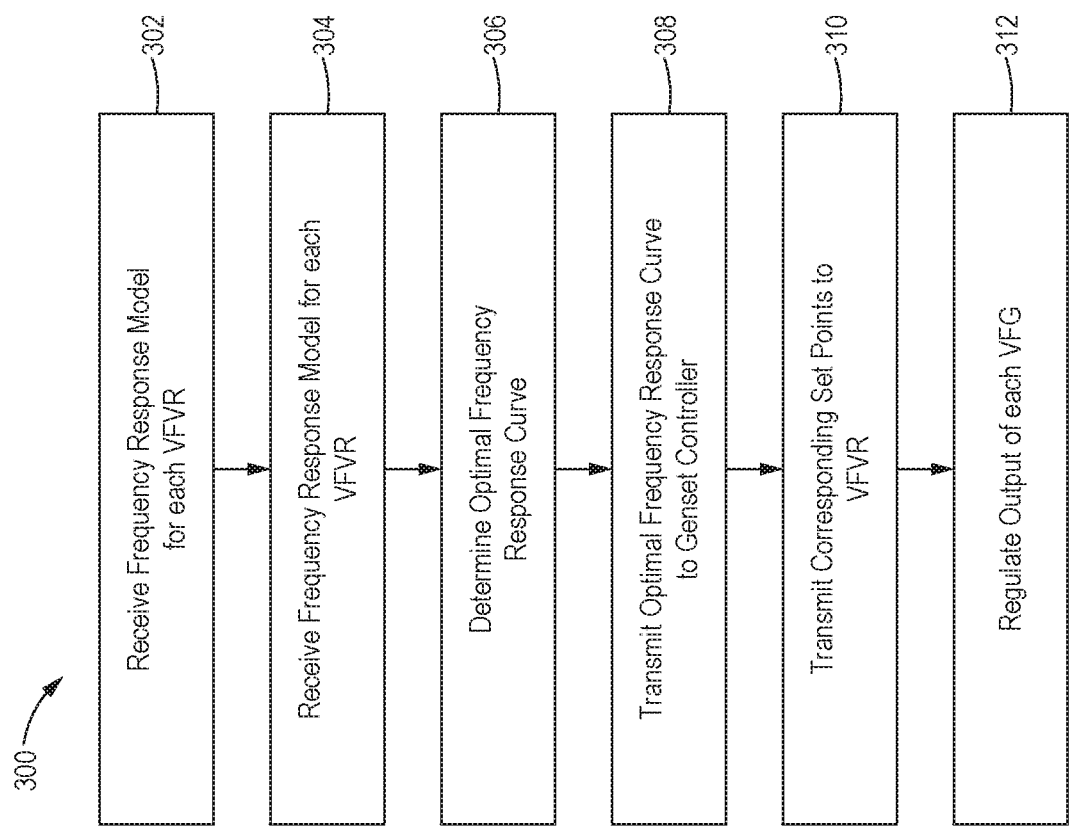
FIG. 3 is a flow chart for a optimal response curve control strategy.

Continuing with reference to FIG. 3, at step 304, the voltage regulation controller 140 receives a frequency response model for each VFVR 128. Each frequency response model may include an index of bus frequencies and corresponding frequency response curves associated with each bus frequency. In one example, the frequency response model may be a lookup table which includes an entry for each optimal bus frequency achievable by the VFVR system 100. The lookup table indexes at least one frequency response curve 400 for the corresponding VFG 120 for each optimal bus frequency. For simplicity, the term frequency response model may be inclusive of the plurality of frequency response curves associated with each VFG 120. The frequency response models may be stored in memory locally on the voltage regulation controller 140 or in a remote location accessible by the voltage regulation controller 140.

Once the desired bus frequency is determined, the voltage regulation controller 140 can identify the corresponding optimal frequency response curve and/or curves for each VFG 120 based on the frequency response models. At step 306, the voltage regulation controller 140 determines the optimal frequency response curve 400 for each VFG 120 based on the desired bus frequency of the VFB 134 and the corresponding frequency response model.

At step 308, the voltage regulation controller 140 transmits the optimal frequency response curve to each genset controller 132. The genset controller 132 updates the selected frequency response curve currently utilized to regulate the electrical output of the generator 126 with the optimal frequency response curve. The voltage regulation controller 140 may transfer the previously mentioned set points associated with the optimal frequency response curve to each genset controller 132. The genset controller 132 updates the previously stored selected set points associated with the selected frequency response curve with the optimal set points associated with the determined optimal frequency response curve. In this manner, the VFVR system 100 can optimize the current set points of each VFVR 128 in real-time in response to changes in the power demands of the VFL 134.

At step 310, the genset controller 132 transmits optimal set points associated with the optimal frequency response curve to the VFVR 128. Then, at step 312, the VFVR 128 may regulate the electrical output at the generator 126 output terminals based on the optimal set points.

It should be appreciated that updating the selected set points in each VFVR 128 associated with the selected frequency response curve with the optimal set points associated with the determined optimal frequency response curve can be achieved in several ways. In one embodiment, the genset controller 132 may receive the optimal frequency response curve from the voltage regulation controller 140. In another embodiment the genset controller 132 has the frequency response model of the corresponding VFG 120 stored in memory. The genset controller 132 receives instructions from the voltage regulation controller 140 identifying which frequency response curve 400 of the locally stored frequency response model is the optimal frequency response to utilize. In another embodiment, the voltage regulation controller 140 may transmit the optimal set points associated with the determined optimal frequency response curve directly to the VFVR 128 via the genset controller 132.

INDUSTRIAL APPLICABILITY

In general, the present disclosure finds utility in marine application, but can also find utility in various other applications such as mining, off-shore drilling, construction, farming, transportation, and other industries. In particular, the present disclosure provides cost-efficient, fuel-efficient, and simple solutions for operating multiple variable frequency gensets in parallel to directly supply power to a variable frequency bus without any frequency conversion.

Typically, each variable frequency genset is comprises a voltage regulator to regulate the electrical output of the genset. As changes in the load occur, a genset controller adjusts the speed and/or torque of the genset to match the power demands of the load. However, the governor of the prime mover can response instantaneously to, for example, load increases which cause a drop in the output voltage and/or frequency of the genset. A voltage regulator can compensate for the drop in output voltage and/or frequency by imparting a field current on the excitor of the generator to maintain terminal voltage and/or frequency at the desired power demands of the load.

Typically, a voltage regulator is programmed with a set points for common bus frequencies such as 50 Hz and 60 Hz. However, common bus architectures which operate on a common frequency require VFDs to match the operating frequency of the gensets and the loads with that of the common bus, e.g. 50 Hz or 60 Hz. Each VFD within the system can impart a 2% to 8% loss in efficiency. The present disclosure aims to improve fuel efficiency, reduce system costs, reduce system complexity, and decrease maintenance costs by optimizing the set points of VFVRs 128 in real-time based on changes of the optimal bus frequency of a VFB 132. In particular, as part of a load sharing scheme the VFVR system 100 aims to regulate the electrical output of each of the plurality of VFGs 120 that are directly connected to a VFB 132 to directly service a VFL 122 independent of any frequency conversion stages.

With reference to FIG. 5, a flow chart for a voltage regulation control strategy 500 is illustrated. At step 502, the voltage regulation controller 140 is configured to determine the desired bus frequency of the VFB 134 based on the power demand requirements of a VFL 132 and the performance characteristics of each VFG 120 operatively connected to the VFB 134. At step 504, based on the desired bus frequency, the voltage regulation controller 140 determines the optimal frequency response curve for each VFG 120 according to a frequency response model. As previously mentioned, the frequency response model indexes each desired bus frequency with one or more optimal frequency response curves associated with each VFG 120 at the desired bus frequency. At step 506, each genset controller 132 receives the corresponding optimal frequency curve 400 from the voltage regulation controller 140 and transmits the corresponding optimal set points to the the VFVR 128. And, at step 508, the VFVR 128 regulates the output of the corresponding VFG 120 according to the optimal set points.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

What is claimed is:

1. A variable frequency voltage regulation system, comprising:
    a variable frequency bus (VFB);
    a variable frequency load (VFL) directly connected to the VFB;
    a plurality of variable frequency gensets (VFGs) directly connected to the VFB, each VFG including:
        a genset controller configured to select set points based on a selected frequency response curve of the VFG, and
        a variable frequency voltage regulator (VFVR) configured to regulate an electrical output of the VFG based on the selected set points; and a voltage regulation controller in electrical communication with the plurality of genset controllers and the VFB, the voltage regulation controller is configured to:
- determine a desired bus frequency of the VFB based on the VFL;
- determine an optimal frequency response curve based on the desired bus frequency and a frequency response model of each VFG; and
- update the selected frequency response curve based on the determined optimal frequency response curve.

2. The variable frequency voltage regulation system according to claim 1, wherein each VFG further comprises a generator with the electrical output connected directly to the variable frequency bus, and the VFVR is configured to modulate a field current of the generator to regulate the electrical output of the VFG.

3. The variable frequency voltage regulation system according to claim 1, wherein the genset controller is configured to generate performance characteristics of a corresponding genset, and the desired bus frequency is determined based on the VFL and generated performance characteristics of the plurality of VFGs.

4. The variable frequency voltage regulation system according to claim 1, wherein the frequency response model comprises an index of bus frequencies and at least one frequency response curve at each bus frequency for each of the plurality of VFGs, the voltage regulation controller determines the optimal frequency response curve based on the index and the determined desired bus frequency.

5. The variable frequency voltage regulation system according to claim 1, wherein the optimal frequency response curve comprises an undervoltage set point, an underfrequency set point, and at least one knee frequency.

6. The variable frequency voltage regulation system according to claim 5, wherein the VFVR is configured to modulate a field current of an exciter to regulate the electrical output based on the at least one knee frequency.

7. The variable frequency voltage regulation system according to claim 6, wherein the at least one knee frequency is associated with a volts per hertz threshold.

8. A method for variable frequency voltage regulation of a plurality of variable frequency gensets (VFGs) directly connected to a variable frequency bus (VFB), the method comprising:
- selecting set points based on a selected frequency response curve of a corresponding VFG;
- regulating an electrical output of the VFG based on the selected set points
- determining a desired bus frequency of the VFB based on a variable frequency load (VFL) directly connected to the VFB;
- determining an optimal frequency response curve based on the desired bus frequency and a frequency response model of each VFG; and
- updating the selected frequency response curve based on the determined optimal frequency response curve.

9. The variable frequency voltage regulation method of claim 8, wherein each VFG further comprises a generator with the electrical output connected directly to the variable frequency bus, and the method further comprises modulating a field current of the generator to regulate the electrical output of the VFG.

10. The variable frequency voltage regulation method of claim 8, further comprising:
- generating performance characteristics of a corresponding genset; and
- determining the desired bus frequency based on the VFL and generated performance characteristics of the plurality of VFGs.

11. The variable frequency voltage regulation method of claim 8, wherein the frequency response model comprises an index of bus frequencies and at least one frequency response curve at each bus frequency for each of the plurality of VFGs, the method further comprising:
- determining the optimal frequency response curve based on the index and the determined desired bus frequency.

12. The variable frequency voltage regulation method of claim 8, wherein the optimal frequency response curve comprises an undervoltage set point, an underfrequency set point, and at least one knee frequency.

13. The variable frequency voltage regulation method of claim 12, wherein the VFVR is configured to modulate a field current of an exciter to regulate the electrical output based on the at least one knee frequency.

14. The variable frequency voltage regulation method of claim 12, wherein the at least one knee frequency is associated with a volts per hertz threshold.

15. A variable frequency microgrid comprising:
- a variable frequency bus (VFB) configured to operate at a range of bus frequencies;
- a plurality of variable frequency gensets (VFGs) operatively connected to the VFB;
- a variable frequency load (VFL) operatively connected to the VFB;
- a voltage regulation controller operatively connected to the VFB and the plurality of VFGs, wherein the voltage regulation controller is configured to:
  - determine an optimal bus frequency, and
  - determine an optimal frequency response curve for each VFG based on the optimal bus frequency; and
- a plurality of variable frequency voltage regulators (VFVRs), wherein each VFVR is configured to regulate an output of a corresponding VFG according to optimal setpoints associated with the determined optimal frequency response curve.

16. The variable frequency microgrid of claim 15, wherein each VFG further comprises a generator with the electrical output connected directly to the variable frequency bus, and the VFVR is configured to modulate a field current of the generator to regulate the electrical output of the VFG.

17. The variable frequency microgrid of claim 15, wherein the voltage regulation controller determines the optimal frequency response curve based on a lookup table which indexes desired bus frequencies with at least one optimal frequency response curve.

18. The variable frequency microgrid of claim 17, wherein the optimal frequency response curve comprises at least an optimal knee frequency associated with a volts per hertz threshold.

19. The variable frequency microgrid of claim 15, wherein the voltage regulation controller determines the desired bus frequency based on performance characteristics of each VFG and power demand requirements of the VFL.

20. The variable frequency microgrid of claim 19, wherein the power demand requirements of the VFL comprises at least one of a frequency requirement, a voltage requirement, a future load requirement, a variability requirement, a load request, or historical data.

* * * * *